United States Patent Office 3,051,635
Patented Aug. 28, 1962

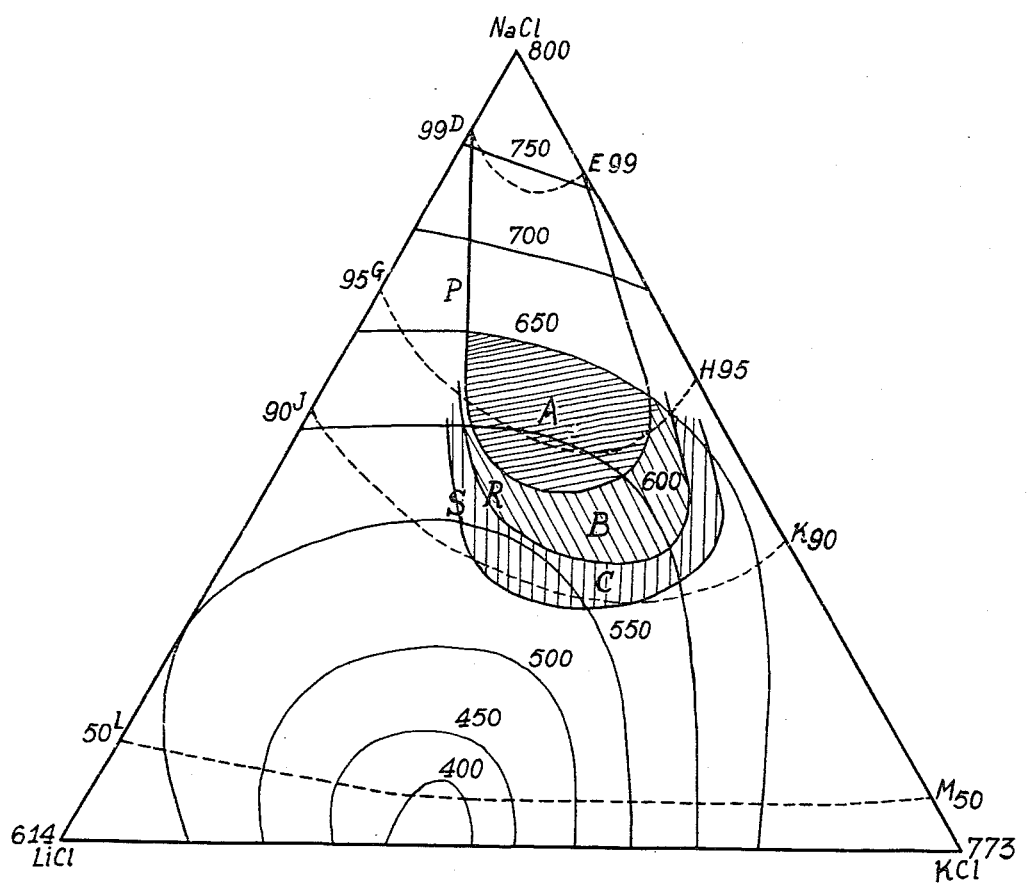

3,051,635
PROCESS FOR THE MANUFACTURE OF SODIUM BY ELECTROLYSIS OF FUSED SALT BATHS
Jacques van Diest, Uccle, Brussels, Belgium, assignor to Solvay & Cie, Brussels Belgium, a Belgian company
Filed June 14, 1960, Ser. No. 35,961
Claims priority, application Belgium June 17, 1959
2 Claims. (Cl. 204—68)

The present invention concerns a new process for the preparation of sodium in a very pure state, by electrolysis of fused salt baths.

The conventional processes for the preparation of sodium by electrolysis of fused salt baths have recourse to bath compositions, generally mixtures of sodium chloride and calcium chloride, which require high energy consumption by reason of the fact that the current yields are low.

The process forming the object of the present invention permits these disadvantages to be avoided and sodium to be obtained which is very pure by electrolysis of fused salt baths with a very high current yield.

The applicant has discovered that it is possible to manufacture sodium in a very pure state, by subjecting to electrolysis at a temperature lower than that of the usual processes and under a voltage about 25% lower than that of the said processes, that is to say under a voltage of between 5 and 7 volts, a bath of fused salts constituted by sodium chloride, lithium chloride, and at least one salt selected from potassium chloride, rubidium chloride and caesium chloride. The applicant has discovered the surprising fact that in electrolysing a bath formed of the abovementioned salts, the lithium, under the conditions of temperature of the electrolysis, behaves as a less noble metal, from the electrochemical point of view, than sodium. The applicant has further found that by regulating in an appropriate manner the proportion of sodium ions and lithium ions in the bath, a whole range of alloys of lithium and sodium can be obtained.

All the baths composed of the abovementioned salts are suitable for the preparation of sodium and offer the advantage that, according to the selection of bath components, that temperature can be taken at which electrolysis can be carried out to attain maximum current yield, and to determine in advance the purity of metal or the precise composition of alloy which is desired to be obtained. The applicant has thus found that for the proposed baths the optimum operating temperature for electrolysis is 1.05 to 1.15 times the temperature of solidification of the mixture subjected to electrolysis.

The process for producing sodium in the pure state according to the invention is furthermore characterised in that there is subjected to electrolysis, at a temperature below 700° C. and under a voltage of 5–7 volts, a bath of fused salts constituted by $x$ gram molecules percent of sodium chloride, $y$ gram molecules percent of lithium chloride and $z$ gram molecules percent of at least one salt selected from potassium chloride, rubidium chloride and caesium chloride, the ratio $x:y$ being between 0.7 and 4.0 and the ratio $z:y$ being between 0.1 and 2.

Preferably quantities of salt are used such that the ratio $x:y$ is between 1 and 3 and the ratio $z:y$ between 1 and 2.

The invention is explained in detail by reference to the single FIGURE of the accompanying drawing.

This figure represents the ternary diagram NaCl—LiCl—KCl established by the conventional method. On this diagram, the continuous curves marked 400, 450, . . . 750 represent the melting isothermals. At three peaks, the respective melting points of NaCl, KCl, and LiCl are indicated—800° C., 773° C. and 614° C. On the axes NaCl—LiCl and NaCl—KCl of the ternary diagram, there are indicated points D and E, G and H, J and K and L and M which represent the molecular composition of binary mixtures NaCl—LiCl and NaCl—KCl which are suitable for use for preparing sodium of respectively 99%, 95%, 90% and 50% purity. Thus the point D, corresponding to a binary mixture NaCl 90 gr.-mol percent+LiCl 10 gr.-mol percent permits the preparation of sodium of 99% purity, but at a temperature above 750° C. Likewise, the point E corresponds to a binary mixture NaCl 86 gr.-mol percent KCl 14 gr.-mol percent which similarly permits the preparation of sodium of 99% purity, but always at a temperature above 750° C. If it is desired to work at a lower temperature with binary mixtures, a metal is obtained of which the purity diminishes as a function of the temperature, since increasing quantities of LiCl or of KCl have to be added to the NaCl, to be able to reduce precisely the fusion temperature of the binary mixtures.

It could normally be expected that by adding a third salt to the binary mixture, it would still be possible to prepare sodium, for example of 99% purity, but at a temperature only very slightly lower than that observed in the case of binary mixtures. This anticipation is represented on the diagram by the dotted curves joining the points D—E, G—H (95% purity), J—K (90% purity), and L—M (50% purity). The applicant has, moreover, found the surprising and most unexpected fact, i.e. that the curves which join the points representing the binary mixtures NaCl—LiCl and NaCl—KCl from which sodium can be prepared with a degree of purity above or equal to 96%, bend very strongly towards temperature zones well below 700° C. These curves are designated by P, R and S on the graph. Thus by selecting suitable ternary compositions sodium can be prepared which is very pure, at very low temperatures. Thus the hatched zones A, B and C represent the zones of composition which combine a good purity of metal deposited at the cathode with a low bath temperature. The following table clearly illustrates the advantages of these baths:

| NaCl, mol percent | KCl, mol percent | LiCl, mol percent | T. °C., fusion | T. °C., working | Composition of metal | | |
|---|---|---|---|---|---|---|---|
| | | | | | Na mol percent | K mol percent | Li mol percent |
| 50 | 25–30 | 20–25 | 590 | 650 | 99 | | 1 |
| 40 | 30–40 | 20–30 | 560 | 615 | 98 | 0.5 | 1.5 |
| 30–35 | 30–40 | 25–35 | 525 | 580 | 96 | 1 | 3 |

In these baths, KCl can be replaced wholly or partly by the chloride of rubidium and/or the chloride of caesium. In this way a reduction of temperature of working of the order of 50 to 100° C. is achieved.

The process according to the invention may be carried out in any known apparatus for electrolysis in the fused state; however, an apparatus is preferably used such as that described in Belgian Patent No. 578,670 where the anode is of annular form and in which an insulating impermeable screen imposes a non-rectilinear path on the lines of current between the electrodes.

The following examples, given by way of illustration, permit detailed understanding of the invention; it is to be understood that they in no way limit the scope of the invention.

*Example 1*

In the electrolysis cell, a bath is arranged constituted by:

Gr.-mol percent
NaCl _____ 48
KCl _____ 28
LiCl _____ 24

The working temperature for such a bath is fixed at 650° C. Before commencing the electrolysis the bath is purified by passing through chlorine or dry hydrogen chloride. If desired, a preliminary electrolysis at 2 to 3 volts may be combined with this purification.

After purification the bath of fused salts is subjected to electrolysis under a voltage of 5.5 volts, the cathode current density being 2 amperes per cm.$^2$. Sodium of 99% purity is recovered containing less than 0.5% of potassium and less than 1% of lithium, with a current yield of 81%, the consumption of energy being lower than 10 kilowatt-hours/kilogram of sodium manufactured.

*Example 2*

The bath is purified as in Example 1. The bath is constituted by:

| | Gr.-mol percent |
|---|---|
| NaCl | 35 |
| KCl | 35 |
| LiCl | 30 |

The working temperature is fixed at 580° C. The bath is subjected to electrolysis under a voltage of 5.7 volts, the cathode current density being 2 amperes/cm.$^2$. Sodium of 97% purity is recovered containing less than 0.5% potassium and less than 3% lithium, with a current yield of 83%; the energy consumption is definitely lower than 10 kilowatt-hours per kilogram of sodium manufactured.

*Example 3*

The bath is constituted by:

| | Gr.-mol percent |
|---|---|
| NaCl | 30 |
| LiCl | 30 |
| CsCl | 40 |

The bath is purified as in Example 1 and the working temperature is fixed at 490° C. The bath is subjected to electrolysis under a voltage of 6 volts, the cathode current density being 2 amperes per cm.$^2$. Sodium of 97% purity is recovered, containing less than 0.5% caesium and less than 3% lithium, with a current yield of 83%, the energy consumption being of the order of 10 kilowatt-hours per kilogram of sodium manufactured.

Likewise, alloys of sodium and lithium can also be prepared from the ternary baths indicated above. To this effect, it is suitable to adjust carefully the proportions of ions of sodium and lithium in the bath of fused salts. Thus, a bath constituted of:

| | Gr.-mol percent |
|---|---|
| NaCl | 2 |
| KCl | 54 |
| LiCl | 44 | permits the preparation at a temperature of 400° C., of an alloy containing 54% sodium and 46% lithium.

Similarly a bath constituted by:

| | Gr.-mol percent |
|---|---|
| NaCl | 3 |
| LiCl | 56 |
| RbCl | 41 | permits the preparation at a temperature of 350° C., of an alloy containing 56% sodium and 44% of lithium.

I claim:

1. A process for producing sodium in a pure state by electrolysis of boths of fused salts which comprises subjecting to electrolysis at a temperature below 700° C. and under a voltage of 5 to 7 volts a bath of salts constituted by $x$ gram molecule percent of sodium chloride, $y$ gram molecule percent of lithium chloride and $z$ gram molecule percent of at least one salt selected from the group consisting of potassium chloride, rubidium chloride and caesium chloride, the ratio $x:y$ being between 1 and 3 and the ratio $z:y$ being between 1 and 2.

2. A process as defined in claim 1, wherein the temperature of operation is 1.05 and 1.15 times the solidification temperature of the mixture of salts subjected to electrolysis.

References Cited in the file of this patent

UNITED STATES PATENTS

| 1,375,330 | Smith et al. | Apr. 19, 1921 |
| 2,876,181 | Wood | Mar. 3, 1959 |
| 2,880,156 | Benner et al. | Mar. 31, 1959 |